March 11, 1930. E. H. CHANDONIA 1,749,800
BAKING PAN UNIT
Filed June 15, 1927 2 Sheets-Sheet 1

Inventor
ELMER H. CHANDONIA,
By Murray & Zugelter
Attorneys

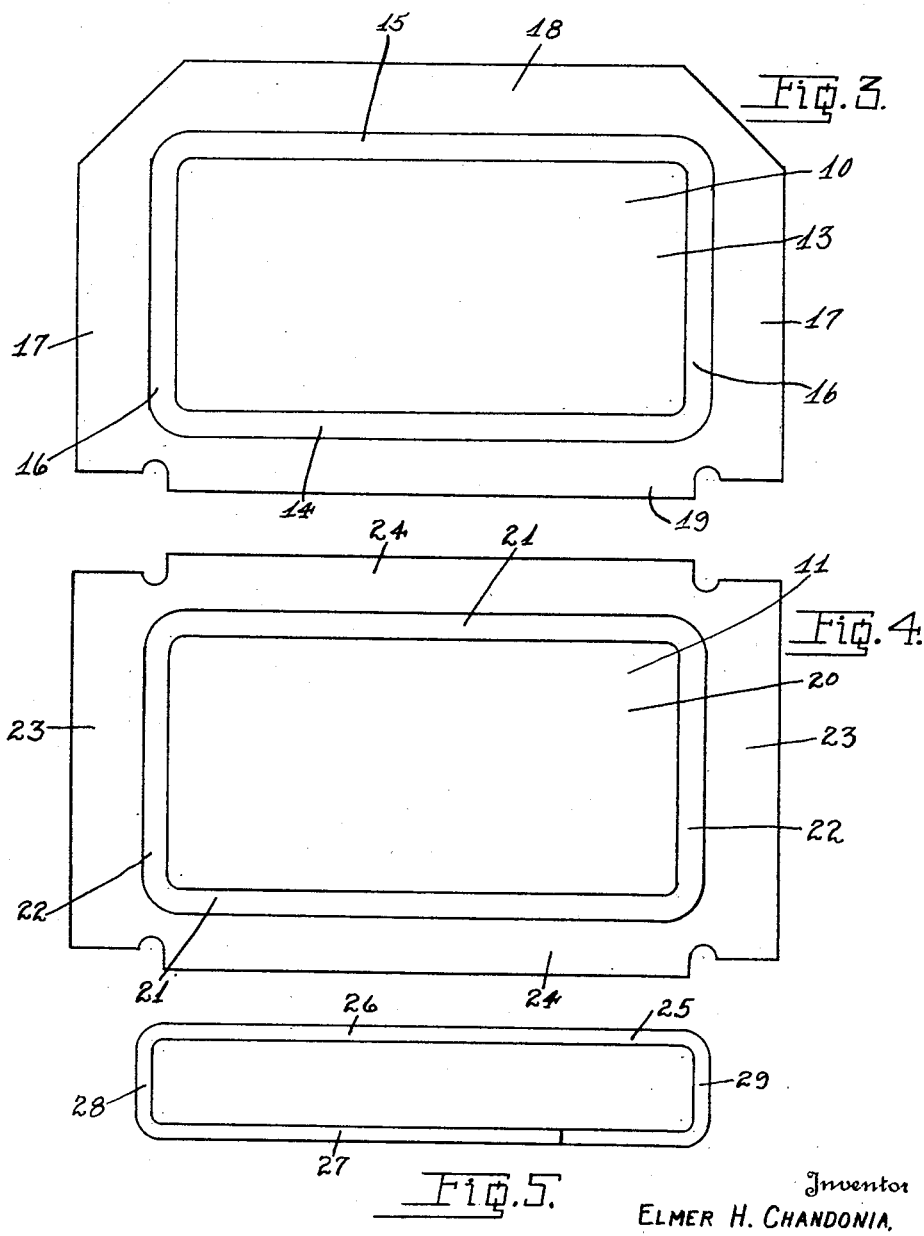

Patented Mar. 11, 1930

1,749,800

UNITED STATES PATENT OFFICE

ELMER H. CHANDONIA, OF DAYTON, KENTUCKY, ASSIGNOR TO LOCKWOOD MANUFACTURING COMPANY, OF CINCINNATI, OHIO, A CORPORATION OF OHIO

BAKING-PAN UNIT

Application filed June 15, 1927. Serial No. 199,106.

This invention relates to improvements in construction and manufacture of bakers' baking pans and has for its object the strengthening of the pans when they are assembled in a unit.

Another object of this invention is to provide a simple, economical and rigid connection between adjacent pans of a multiple baking pan unit.

These and other objects are attained by the means described herein and disclosed in the accompanying drawing, in which:—

Fig. 3 is a detailed view of one of the end pans.

Fig. 4 is a detailed view of one of the intermediate pans.

Fig. 5 is a detailed view of a link forming a connection between adjacent pans.

Figure 1:
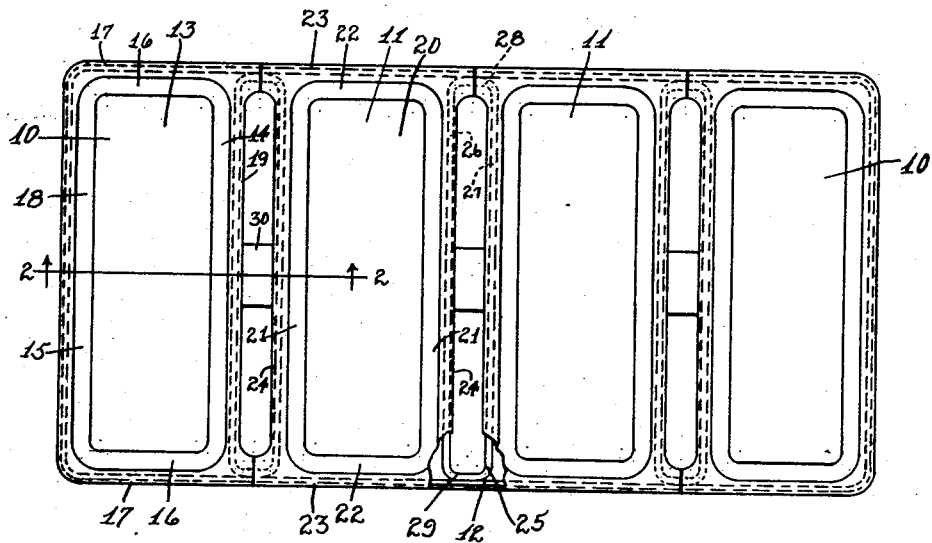
Fig. 1 is a top plan view of a unit of four baking pans embodying this invention.

The set of pans here shown comprises two end pans 10 and two intermediate pans 11 entirely surrounded by a metal strap or band 12. While the set illustrated herein discloses but two intermediate pans it is understood that any number of such intermediate pans may be employed, or the unit may have no intermediate pans, just two end pans.

Each of the end pans 10, as shown in Fig. 3, comprises a bottom 13, side walls 14 and 15 and end walls 16. The end walls 16 have flanges 17 at their upper edges similar to a flange 18 formed at the upper edge of the side wall 15. The side wall 14 has a flange 19 at its upper edge but this flange 19 is considerably narrower than the flanges 17 and 18.

Each of the intermediate pans 11 comprises a bottom 20, side walls 21 and end walls 22. Each of the end walls 22 has formed at its upper end a flange 23 which flange is equal in width to the flanges 17 formed on the end pans 10. The side walls 21 are also provided with flanges 24 which flanges are equal in width to the flange 19 formed on the end pan 10. It will also be noted that the flanges 23 are considerably wider than the flanges 24.

Figure 2:
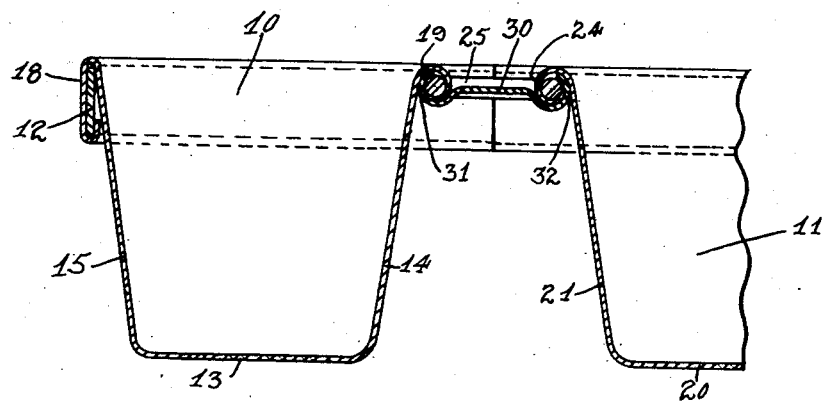
Fig. 2 is an enlarged sectional view taken on lines 2—2 of Fig. 1.

The flanges 17, 18 and 23 are bent downwardly around the metal strap or band 12 as shown in Fig. 2. It will be noted that the strap or band 12 has considerable width wherefore the flanges 17, 18 and 23 are substantially enlarged. The flanges 19, on the end pans 10, and the flanges 24, on the intermediate pans 11, are bent downwardly and around a wire link 25. The link 25 comprises a pair of parallel arms 26 and 27 having their opposite ends joined as shown at 28 and 29. The flange 19 on the end pan 10 surrounds, for example, the arm 26 of the link 25 while the flange 24 of the intermediate pan will surround the remaining arm 27 of the link 25. By reference to Fig. 1 it will be noted that the ends 28 and 29 of the link 25 abut the band or strap 12. By this arrangement, the adjacent edges of the intermediate pans and also adjacent edges of the end pan and one of the intermediate pans are substantially strengthened and reinforced.

In order to permit sufficient heat to pass between the pans to properly bake the contents thereof; adjacent pans are separated by means of a spacing tying member 30. The member 30, as shown herein has its opposite ends 31 and 32 folded around the wire loop 25 and clamped between the wire loop on the flange on the pan. The member 30 not only spaces the pans from one another but retains the arms 26 and 27 in their proper place and prevents said arms from being bent either into the pan or outside of the pan.

The practice followed heretofore is aptly illustrated in the patent to E. F. Lockwood 1,149,928 wherein a wire frame surrounds the upper edge of each of the pans except in the center where a separate link is used to connect the pans. By using this separate link to connect the pans it is necessary to cut the flanges thereby weakening the pans and causing them to sag under certain conditions. All of these defects have been overcome by the construction described and shown herein.

What is claimed is:

1. A multiple pan unit comprising a plurality of pans arranged in the form of substantially a rectangular unit, the pans having flanges on each of their edges, a flat, rigid strap member surrounding the rectangular unit and having the adjacent flanges of the several pans turned about it, the said flanges of the pans having integral means for abutment one with the other whereby to provide uniform spacing between adjacent pans in the unit, and elongated links having opposed ends abutting the strap and the remaining flanges of adjcent pans turned thereabout for strengthening said edges of the pans and means to preclude lateral collapse of the links.

2. In a multiple pan unit the combination of a plurality of pans arranged in spaced relation in substantially the form of a rectangle, said pans having walls outwardly inclined toward the top, a flange extending from the top of each side of each pan, a flat strap member surrounding said plurality of pans and having its width disposed substantially at right angles to the tops of the pans, the adjacent flanges of said pans being passed outwardly, downwardly, inwardly and upwardly about said strap for rigidly securing the strap to the pans, the adjacent edges of flanges on adjacent pans abutting one another where said flanges are passed about the strap, whereby the strap is held substantially out of contact with the inclined walls of the pans, link member disposed between adjacent pans and abutting the trap at their opposite ends and means to preclude collapse of said links.

3. In a multiple pan unit construction, the combination of a plurality of pans each having end flanges and side flanges at the top thereof, a strap surrounding a plurality of said pans, and having the end flanges of the pans turned thereabout, the side flanges of the pans extending relatively further in a given direction than the end flanges, links disposed between adjacent pans and having the extended side flanges turned about them whereby to draw the adjacent portions of the end flanges into abutment, one with the other and to provide a free and unobstructed opening between pans intermediate said flanges.

4. In a multiple pan unit construction the combination of a plurality of pans each having top flanges along the sides and ends, a strap surrounding said plurality of pans and having the end flanges of each pan turned about it, the edges of adjacent end flanges of adjacent pans abutting one another on the strap and for a distance beyond the strap at the top of the unit, and links disposed between adjacent pans and having the side flanges turned about them for providing an open space between the pans and for retaining the aforementioned edges of the end flanges in rigid abutment.

In testimony whereof, I have hereunto subscribed my name this 27th day of May, 1927.

ELMER H. CHANDONIA.